US008686941B2

(12) United States Patent
Rank

(10) Patent No.: US 8,686,941 B2
(45) Date of Patent: *Apr. 1, 2014

(54) HAPTIC FEEDBACK SENSATIONS BASED ON AUDIO OUTPUT FROM COMPUTER DEVICES

(71) Applicant: Immersion Corporation, San Jose, CA (US)

(72) Inventor: Stephen D. Rank, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/719,755

(22) Filed: Dec. 19, 2012

(65) Prior Publication Data

US 2013/0106691 A1   May 2, 2013

Related U.S. Application Data

(63) Continuation of application No. 12/623,685, filed on Nov. 23, 2009, now Pat. No. 8,441,437, which is a continuation of application No. 09/974,759, filed on Oct. 9, 2001, now Pat. No. 7,623,114.

(51) Int. Cl.
*G09G 5/00* (2006.01)

(52) U.S. Cl.
USPC .......................................................... 345/156

(58) Field of Classification Search
USPC ................... 340/407.1; 345/156–181; 463/30
See application file for complete search history.

(56) References Cited

U.S. PATENT DOCUMENTS

| 2,972,140 A | 2/1961 | Hirsh |
| 3,157,853 A | 11/1964 | Hirsh |
| 3,220,121 A | 11/1965 | Cutler |
| 3,497,668 A | 2/1970 | Hirsh |
| 3,517,446 A | 6/1970 | Corlyon et al. |
| 3,623,046 A | 11/1971 | Scourtes |
| 3,623,064 A | 11/1971 | Kagan |
| 3,765,624 A | 10/1973 | Kaniuka |
| 3,902,687 A | 9/1975 | Hightower |

(Continued)

FOREIGN PATENT DOCUMENTS

| DE | 19613025 A1 | 3/1996 |
| EP | 0349086 | 1/1990 |

(Continued)

OTHER PUBLICATIONS

International Search Report in PCT Application No. PCT/US02/31979, dated Dec. 12, 2002.

(Continued)

*Primary Examiner* — Michael Pervan
(74) *Attorney, Agent, or Firm* — Miles & Stockbridge P.C.

(57) ABSTRACT

Triggering haptic sensations based on sound output from a computer device. A portion of sound data is stored that is output to a user as audio from an application program running on a computer. The portion of sound data is analyzed using intelligent heuristics to extract at least one sound feature from the sound data. The execution of at least one haptic effect is triggered based on the sound feature, where the haptic effect is commanded to the haptic feedback device approximately correlated to the output of the portion of sound to the user as audio. The haptic effect causes a haptic sensation to be output to the user. Different haptic effects can be associated with different sound features, frequency ranges, amplitudes, etc.

15 Claims, 5 Drawing Sheets

(56) References Cited

U.S. PATENT DOCUMENTS

| | | |
|---|---|---|
| 3,903,614 A | 9/1975 | Diamond et al. |
| 3,911,416 A | 10/1975 | Feder |
| 4,127,752 A | 11/1978 | Lowthorp |
| 4,160,508 A | 7/1979 | Salisbury, Jr. |
| 4,236,325 A | 12/1980 | Hall et al. |
| 4,237,439 A | 12/1980 | Nemoto |
| 4,262,240 A | 4/1981 | Arai |
| 4,262,549 A | 4/1981 | Schwellenbach |
| 4,333,070 A | 6/1982 | Barnes |
| 4,334,280 A | 6/1982 | McDonald |
| 4,355,348 A | 10/1982 | Williams |
| 4,382,217 A | 5/1983 | Horner et al. |
| 4,422,060 A | 12/1983 | Matsumoto et al. |
| 4,464,117 A | 8/1984 | Foerst |
| 4,484,191 A | 11/1984 | Vavra |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | de Vries et al. |
| 4,713,007 A | 12/1987 | Alban |
| 4,731,603 A | 3/1988 | MacRae et al. |
| 4,768,412 A | 9/1988 | Sanderson |
| 4,794,392 A | 12/1988 | Selinko |
| 4,885,565 A | 12/1989 | Embach |
| 4,891,764 A | 1/1990 | McIntosh |
| 4,897,582 A | 1/1990 | Often et al. |
| 4,930,770 A | 6/1990 | Baker |
| 4,933,584 A | 6/1990 | Harms et al. |
| 4,934,694 A | 6/1990 | McIntosh |
| 4,935,728 A | 6/1990 | Kley |
| 4,937,685 A | 6/1990 | Barker et al. |
| 5,019,761 A | 5/1991 | Kraft |
| 5,022,384 A | 6/1991 | Freels et al. |
| 5,022,407 A | 6/1991 | Horch et al. |
| 5,035,242 A | 7/1991 | Franklin et al. |
| 5,038,089 A | 8/1991 | Szakaly |
| 5,078,152 A | 1/1992 | Bond et al. |
| 5,165,897 A | 11/1992 | Johnson |
| 5,175,459 A | 12/1992 | Danial et al. |
| 5,184,310 A | 2/1993 | Takenouchi |
| 5,186,629 A | 2/1993 | Rohen |
| 5,186,695 A | 2/1993 | Mangseth et al. |
| 5,189,355 A | 2/1993 | Larkins et al. |
| 5,194,786 A | 3/1993 | Smith et al. |
| 5,195,179 A | 3/1993 | Tokunaga |
| 5,203,563 A | 4/1993 | Loper, III |
| 5,212,473 A | 5/1993 | Louis |
| 5,240,417 A | 8/1993 | Smithson et al. |
| 5,245,245 A | 9/1993 | Goldenberg |
| 5,264,836 A | 11/1993 | Rubin |
| 5,271,290 A | 12/1993 | Fischer |
| 5,275,174 A | 1/1994 | Cook |
| 5,283,970 A | 2/1994 | Aigner |
| 5,298,890 A | 3/1994 | Kanamaru et al. |
| 5,299,810 A | 4/1994 | Pierce et al. |
| 5,309,140 A | 5/1994 | Everett, Jr. et al. |
| 5,321,762 A | 6/1994 | Stuart |
| 5,327,790 A | 7/1994 | Levin et al. |
| 5,334,027 A | 8/1994 | Wherlock |
| 5,334,893 A | 8/1994 | Oudet et al. |
| 5,347,306 A | 9/1994 | Nitta |
| 5,374,942 A | 12/1994 | Gilligan et al. |
| 5,388,992 A | 2/1995 | Franklin et al. |
| 5,399,091 A | 3/1995 | Mitsumoto |
| 5,405,152 A | 4/1995 | Katanics et al. |
| 5,434,549 A | 7/1995 | Hirabayashi et al. |
| 5,436,622 A | 7/1995 | Gutman et al. |
| 5,437,607 A | 8/1995 | Taylor |
| 5,438,529 A | 8/1995 | Rosenberg et al. |
| 5,440,183 A | 8/1995 | Denne |
| 5,456,341 A | 10/1995 | Garnjost et al. |
| 5,461,711 A | 10/1995 | Wang et al. |
| 5,466,213 A | 11/1995 | Hogan et al. |
| 5,471,571 A | 11/1995 | Smith et al. |
| 5,489,812 A | 2/1996 | Furuhata et al. |
| 5,492,312 A | 2/1996 | Carlson |
| 5,524,187 A | 6/1996 | Feiner et al. |
| 5,524,195 A | 6/1996 | Clanton, III et al. |
| 5,526,480 A | 6/1996 | Gibson |
| 5,547,382 A | 8/1996 | Yamasaki et al. |
| 5,550,562 A | 8/1996 | Aoki et al. |
| 5,554,900 A | 9/1996 | Pop, Sr. |
| 5,565,840 A | 10/1996 | Thorner et al. |
| 5,565,887 A | 10/1996 | McCambridge et al. |
| 5,565,888 A | 10/1996 | Selker |
| 5,570,111 A | 10/1996 | Barrett et al. |
| 5,575,761 A | 11/1996 | Hanjianpour |
| 5,586,257 A | 12/1996 | Perlman |
| 5,596,347 A | 1/1997 | Robertson et al. |
| 5,619,180 A | 4/1997 | Mossimino et al. |
| 5,628,686 A | 5/1997 | Svancarek et al. |
| 5,649,020 A | 7/1997 | McClurg et al. |
| 5,650,704 A | 7/1997 | Pratt et al. |
| 5,651,070 A | 7/1997 | Blunt |
| 5,661,446 A | 8/1997 | Anderson et al. |
| 5,668,423 A | 9/1997 | You et al. |
| 5,669,818 A | 9/1997 | Thorner et al. |
| 5,675,709 A | 10/1997 | Chiba |
| 5,684,722 A | 11/1997 | Thorner et al. |
| 5,690,582 A | 11/1997 | Ulrich et al. |
| 5,696,532 A | 12/1997 | Caprara |
| 5,696,535 A | 12/1997 | Rutledge et al. |
| 5,710,574 A | 1/1998 | Jaaskelainen, Jr. |
| 5,734,236 A | 3/1998 | Motegi |
| 5,737,144 A | 4/1998 | Ataee et al. |
| 5,745,715 A | 4/1998 | Pickover et al. |
| 5,749,533 A | 5/1998 | Daniels |
| 5,757,358 A | 5/1998 | Osga |
| 5,766,016 A | 6/1998 | Sinclair et al. |
| 5,767,457 A | 6/1998 | Gerpheide et al. |
| 5,785,630 A | 7/1998 | Bobick et al. |
| 5,791,992 A | 8/1998 | Crump et al. |
| 5,793,598 A | 8/1998 | Watanabe et al. |
| 5,795,228 A | 8/1998 | Trumbull et al. |
| 5,802,353 A | 9/1998 | Avila et al. |
| 5,805,165 A | 9/1998 | Thorne, III et al. |
| 5,805,601 A | 9/1998 | Takeda et al. |
| 5,808,381 A | 9/1998 | Aoyama et al. |
| 5,808,601 A | 9/1998 | Leah et al. |
| 5,816,823 A | 10/1998 | Naimark et al. |
| 5,818,423 A | 10/1998 | Pulgliese et al. |
| 5,835,693 A | 11/1998 | Lynch et al. |
| 5,841,710 A | 11/1998 | Larsen |
| 5,842,162 A | 11/1998 | Fineberg |
| 5,844,392 A | 12/1998 | Peurach et al. |
| 5,857,986 A | 1/1999 | Moriyasu |
| 5,861,699 A | 1/1999 | Kopac |
| 5,877,748 A | 3/1999 | Redlich |
| 5,877,750 A | 3/1999 | Hanson |
| 5,884,029 A | 3/1999 | Brush, II et al. |
| 5,889,506 A | 3/1999 | Lopresti et al. |
| 5,889,672 A | 3/1999 | Schuler et al. |
| 5,894,263 A | 4/1999 | Shimakawa et al. |
| 5,896,076 A | 4/1999 | van Namen |
| 5,896,125 A | 4/1999 | Niedzweicki |
| 5,896,139 A | 4/1999 | Strauss |
| 5,897,437 A | 4/1999 | Nishiumi et al. |
| 5,914,716 A | 6/1999 | Rubin et al. |
| 5,945,772 A | 8/1999 | Macnak et al. |
| 5,956,040 A | 9/1999 | Asano et al. |
| 5,956,484 A | 9/1999 | Rosenberg et al. |
| 5,959,613 A | 9/1999 | Rosenberg et al. |
| 5,973,670 A | 10/1999 | Barber et al. |
| 5,973,689 A | 10/1999 | Gallery |
| 5,977,977 A | 11/1999 | Kajiya et al. |
| 5,984,880 A | 11/1999 | Lander et al. |
| 5,990,860 A | 11/1999 | Takeuchi |
| 5,990,875 A | 11/1999 | Bi et al. |
| 5,999,185 A | 12/1999 | Kato et al. |
| 6,002,184 A | 12/1999 | Delson et al. |
| 6,005,551 A | 12/1999 | Osborne et al. |
| 6,008,800 A | 12/1999 | Pryor |
| 6,028,593 A | 2/2000 | Rosenberg et al. |
| 6,044,646 A | 4/2000 | Silverbrook |

(56) References Cited

U.S. PATENT DOCUMENTS

| | | | |
|---|---|---|---|
| 6,057,753 | A | 5/2000 | Myers |
| 6,071,194 | A | 6/2000 | Sanderson et al. |
| 6,078,126 | A | 6/2000 | Rollins et al. |
| 6,078,308 | A | 6/2000 | Rosenberg et al. |
| 6,084,587 | A | 7/2000 | Tan et al. |
| 6,088,017 | A | 7/2000 | Tremblay et al. |
| 6,111,562 | A | 8/2000 | Downs et al. |
| 6,111,577 | A | 8/2000 | Zilles et al. |
| 6,131,097 | A | 10/2000 | Peurach et al. |
| 6,139,324 | A | 10/2000 | Roy et al. |
| 6,147,674 | A | 11/2000 | Rosenberg et al. |
| 6,157,367 | A | 12/2000 | Van Der Haar et al. |
| 6,160,489 | A | 12/2000 | Perry et al. |
| 6,160,907 | A | 12/2000 | Robotham et al. |
| 6,161,126 | A | 12/2000 | Wies et al. |
| 6,166,723 | A | 12/2000 | Schena et al. |
| 6,169,540 | B1 | 1/2001 | Rosenberg et al. |
| 6,171,191 | B1 | 1/2001 | Ogata et al. |
| 6,181,318 | B1 | 1/2001 | Lim |
| 6,198,206 | B1 | 3/2001 | Saarmaa et al. |
| 6,210,168 | B1 | 4/2001 | Aiger et al. |
| 6,215,495 | B1 | 4/2001 | Grantham et al. |
| 6,219,034 | B1 | 4/2001 | Elbing et al. |
| 6,252,583 | B1 | 6/2001 | Braun et al. |
| 6,266,053 | B1 | 7/2001 | French et al. |
| 6,268,671 | B1 | 7/2001 | Furuki |
| 6,282,455 | B1 | 8/2001 | Engdahl |
| 6,285,351 | B1 | 9/2001 | Chang et al. |
| 6,292,170 | B1 | 9/2001 | Chang et al. |
| 6,292,174 | B1 | 9/2001 | Mallen et al. |
| 6,292,776 | B1 | 9/2001 | Chengalvarayan |
| 6,300,936 | B1 | 10/2001 | Braun et al. |
| 6,310,604 | B1 | 10/2001 | Furusho et al. |
| 6,326,964 | B1 | 12/2001 | Snyder et al. |
| 6,373,463 | B1 | 4/2002 | Beeks |
| 6,373,465 | B2 | 4/2002 | Jolly et al. |
| 6,394,239 | B1 | 5/2002 | Carlson |
| 6,404,107 | B1 | 6/2002 | Lazarus et al. |
| 6,420,806 | B2 | 7/2002 | Wittig |
| 6,422,941 | B1 | 7/2002 | Thorner et al. |
| 6,433,771 | B1 | 8/2002 | Yocum et al. |
| 6,437,770 | B1 | 8/2002 | Venema et al. |
| 6,456,024 | B1 | 9/2002 | Schmider et al. |
| 6,496,115 | B2 | 12/2002 | Arakawa |
| 6,501,203 | B2 | 12/2002 | Tryggvason |
| 6,587,091 | B2 | 7/2003 | Serpa |
| 6,639,581 | B1 | 10/2003 | Moore et al. |
| 6,654,003 | B2 | 11/2003 | Boldy |
| 6,664,664 | B2 | 12/2003 | Botos et al. |
| 6,686,901 | B2 | 2/2004 | Rosenberg |
| 6,703,550 | B2 | 3/2004 | Chu |
| 6,727,916 | B1 | 4/2004 | Ballard |
| 6,750,877 | B2 | 6/2004 | Rosenberg et al. |
| 6,792,398 | B1 | 9/2004 | Handley et al. |
| 6,819,922 | B1 | 11/2004 | Janz |
| 6,854,573 | B2 | 2/2005 | Jolly et al. |
| 6,885,876 | B2 | 4/2005 | Aaltonen et al. |
| 6,940,497 | B2 | 9/2005 | Vincent et al. |
| 6,963,762 | B2 | 11/2005 | Kaaresoja et al. |
| 7,061,486 | B2 | 6/2006 | Sowizral et al. |
| 7,127,271 | B1 | 10/2006 | Fujisaki |
| 7,161,580 | B2 | 1/2007 | Bailey et al. |
| 7,171,191 | B2 | 1/2007 | Olson |
| 7,175,642 | B2 | 2/2007 | Briggs et al. |
| 7,421,088 | B2 | 9/2008 | Cranfill et al. |
| 7,623,114 | B2 | 11/2009 | Rank |
| 2002/0112035 | A1 | 8/2002 | Carey et al. |
| 2002/0163498 | A1 | 11/2002 | Chang et al. |
| 2003/0058197 | A1 | 3/2003 | Roelofs |
| 2003/0068053 | A1 | 4/2003 | Chu |

FOREIGN PATENT DOCUMENTS

| | | |
|---|---|---|
| EP | 0970714 A2 | 1/2000 |
| JP | 49090914 U | 8/1974 |
| JP | 49118401 U | 10/1974 |
| JP | 50025201 U | 3/1975 |
| JP | 64043398 U | 3/1989 |
| JP | 1135346 A | 5/1989 |
| JP | 48381 | 4/1990 |
| JP | 2185278 | 7/1990 |
| JP | 6085766 | 3/1992 |
| JP | 5192449 | 8/1993 |
| JP | 6075438 A | 3/1994 |
| JP | 6126041 A | 5/1994 |
| JP | 724147 | 1/1995 |
| JP | 07141839 | 6/1995 |
| JP | 10506508 A | 6/1998 |
| JP | 10513593 A | 12/1998 |
| JP | 011196497 A | 7/1999 |
| JP | 2000194427 A | 7/2000 |
| JP | 2001137553 A | 5/2001 |
| WO | 9917850 A1 | 4/1999 |
| WO | 0227705 A1 | 4/2002 |

OTHER PUBLICATIONS

European Search Report in Application No. 02786371.1, dated Dec. 6, 2005.

European Examination Report in Application No. 02786371.1, dated May 19, 2006.

European Examination Report in Application No. 02786371.1, dated May 30, 2007.

Korean Office Action in Application No. 1020047005145, dated Feb. 20, 2009.

Chinese Office Action in Application No. 200810176145.1, dated Dec. 25, 2009.

Chinese Office Action in Application No. 200810176145.1, dated Jun. 10, 2010.

Japanese Office Action in Application No. 2003-535176, dated Dec. 14, 2010.

Japanese Office Action in Application No. 2003-535176, dated Jun. 17, 2008.

Japanese Office Action in Application No. 2003-535176, dated Feb. 1, 2008.

Adelstein, Bernard Dov, "A Virtual Environment System for the Study of Human Arm Tremor," Dept. Of Mechanical Engineering, MIT, (1989), pp. 2-252.

Adelstein, B., et al., "Design and Implementation of a Force Reflecting Manipulandum for Manual Control research," DSC-vol. 42, Advances in Robotics, ASMA, pp. 1-12, (1992).

Aiger et al., "Real-Time Ultrasound Imaging Simulation", 23 pages, (1998).

Aliaga, D., "Virtual Objects in the Real World", Communications of ACM (CACM), vol. 40, No. 3, pp. 49-54, (1997).

Aukstakalnis, S. et al., "Silicon Mirage: The Art and Science of Virtual Reality," Berkeley, CA, Peach Pit Press, pp. 129-180, (1992).

Baigre, S., "Electric Control Loading—A Low Cost, High Performance Alternative," Proceedings of the 12th Interservice/Industry Training Systems Conference, Orlando, Florida, Nov. 1990, pp. 247-254.

Beamish, T. et al., "Designing the Haptic Turntable for Musical Control" in the Proceedings of the 11th Symposium on Haptic Interfaces for Virtual Environment and Teleoperator Systems (HAPTICS 2003), Mar. 22-23, 2003, pp. 24-31.

Bejczy, Antal K., et al., "Generalization of Bilateral Force-Reflecting Control of Manipulators," Proceedings of Fourth CISM—IFToMM Symposium on Theory and Practice of Robots and Manipulators, Zaborow, Poland, Sep. 8-12, 1981, 14 pages.

Bejczy, Antal K. et al., "Universal Computer Control System (UCCS) for Space Telerobots," Proceedings 1987 IEEE International Conference on Robotics and Automation, vol. 1, pp. 318-324, (1987).

Bejczy, A. K. et al., "A Laboratory Breadboard System for Dual-Arm Teleoperation," Third Annual Workshop on Space Operations Automation and Robotics (Soar '89), Jul. 1989, 13 pages.

(56) References Cited

OTHER PUBLICATIONS

Bejczy, Antal K., "Sensors, Controls, and Man-Machine Interface for Advanced Teleoperation," Science, vol. 208, No. 4450, pp. 1327-1335, (1980).

Bejczy, A. K. et al., "Kinesthetic Coupling Between Operator and Remote Manipulator," International Computer Technology Conference, The American Society of Mechanical Engineers, San Francisco, CA, Aug. 12-15, 1980, 9 pages.

Bliss, James C., "Optical-to-tactile Image Conversion for the Blind," IEEE Transactions on Man-Machine Systems, vol. MMS-11, No. 1, (1970), pp. 58-65.

Bro-Nielsen, M., 'Finite Element Modeling in Surgery Simulation', Journal of the IEEE 86(3), 490-503, (1998).

Ouh-Young, M., et al., "Using a Manipulator for Force Display in Molecular Docking," In: Proceedings of 1988 IEEE Robotics and Automation Conference, vol. 3, Philadelphia, PA, pp. 1824-1829, (1988).

Ouh-Young, M., et al., "Force Display in Molecular Docking," Doctoral Dissertation, University of North Carolina at Chapel Hill, UMI Order No. 9034744, (1990), p. 1-369.

Ouhyoung, M., et al., "The Development of a Low-Cost Force Feedback Joystick and Its Use in the Virtual Environment," Proceedings of the Third Pacific Conference on Computer Graphics and Applications, Pacific Graphics, '95, Seoul, Korea, Aug. 21-24, 1995, pp. 309-319, (1995).

Ouhyoung, M. et al., "A Low-Cost Force Feedback Joystick and Its Use in PC Video Games," IEEE Transactions on Consumer Electronics, vol. 41, No. 3, Aug. 1995, pp. 787-794.

Ozdamar, O., FFT Based Digital Tactile Vocoder System for Real Time Use, Medical & Biological Engineering & Computing, vol. 30, No. 2, Mar. 1992, pp. 213-218.

Patrick, N., "Design, Construction, and Testing of a Fingertip Tactile Display for Interaction with Virtual and Remote Environments," Master of Science Thesis, Massachusetts Institute of Technology, Cambridge, MA, (Aug. 1990), 140 pages.

Patrick, N., et al., "Design and Testing of a Non-reactive, Fingertip, Tactile Display for Interaction with Remote Environments,"Cooperative Intelligent Robotics in Space, Proceedings of the SPIE vol. 1387, pp. 215-222, (1990).

Pelillo, M. et al., "Matching Hierarchical Structures Using Association Graphs," IEEE Transactions On Pattern Analysis and Machine Intelligence, vol. 21, No. 11, pp. 1105-1119, Nov. 1999.

Pimentel, K. et al., "Virtual Reality: Through the New Looking Glass," McGraw-Hill Inc., New York, NY, chapters 3-8, pp. 41-202 (1995).

Rabinowitz, W.M. et al., "Multidimensional Tactile Displays: Identification of Vibratory Intensity, Frequency, and Contactor Area," J. Acoust. Soc. Am. 82 (4), Oct. 1987, pp. 1243-1252.

Reed, C., et al, "Research on Tactile Communication of Speech: a Review," ASHA Monographs, No. 20, Rockville, Md., American Speech-Language-Hearing Association, (1982), 24 pages.

Rosenberg, Louis B., "Virtual Fixtures": Perceptual Overlays Enhance Operator Performance in Telepresence Tasks, Dept. of Mechanical Engineering, Stanford University, Aug. 1994, pp. ii-214.

Russo, M. A., "The Design and Implementation of a Three Degree of Freedom Force Output Joystick," Dept. of Mechanical Engineering, MIT, May 1990, 131 pages.

Russo, M., et al., "Controlling Dissipative Magnetic Particle Brakes in Force Reflective Devices," DSC—vol. 42, Advances in Robotics, ASME 1992, pp. 63-70, (1992).

"Coaxial Control Shaker Part No. C-25502," Safe Flight Instrument Corporation, Jul. 1967, Revised Jul. 1980, 23 pages.

"Coaxial Control Shaker Part No. C-25502," Component Manual, Safe Flight Instrument Corporation, Jul. 1967, Revised Jan. 2002, 3 pages.

Saito, K. et al., "A Microprocessor-Controlled Speed Regulator with Instantaneous Speed Estimation for Motor Drives," Proceedings of the IEEE Transactions on Industrial Electronics, vol. 35, No. 1, Feb. 1988, pp. 95-99.

Scannell, T., "Taking a Joystick Ride," vol. 9 Computer Currents No. 11, Boston Edition, (Nov. 1994), 3 pages.

Shahinpoor, M., "A New Effect in Ionic Polymeric Gels : The Ionic Flexogelectric Effect," in: Proc. SPIE 1995 North American Conference on Smart Structures and Materials, Feb. 28-Mar. 2, 1995, San Diego, CA, vol. 2441, paper No. 05, pp. 42-53 (1995).

Shimoga K., "Finger Force and Touch Feedback Issues in Dexterous Telemanipulation", in: Proceedings Fourth Annual Conference on Intelligent Robotic Systems for Space Exploration, Rensselaer Polytechnique Institute, Troy, NY, Sep. 30-Oct. 1, 1992, pp. 159-178, (1992).

Snow et al., "Model-X Force-Reflecting-Hand-Controller", NT Control No. NPO-17851; JPL Case No. 7348, pp. 1-4 with 25 pages of attachments, (1989).

Sparks, D. et al., "Investigating the MESA (Multipoint Electrotactile Speech Aid): the transmission of segmental features of speech," Journal of the Acoustical Society of America, vol. 63, No. 1, Jan. 1978, pp. 246-257.

Stanley, M., et al., "Computer Simulation of Interacting Dynamic Mechanical Systems Using Distributed Memory Parallel Processors," DSC—vol. 42, Advances in Robotics, ASME 1992, pp. 55-61, (1992).

Su, S., et al., "The Virtual Panel Architecture: A 3D Gesture Framework," in: 1993 IEEE Virtual Reality Annual International Symposium (VRAIS 1993), Sep. 18-22, 1993, Seattle, WA, pp. 387-393, (1993).

Tadros, A. H., "Control System Design for a Three Degree of Freedom Virtual Environment Simulator Using Motor/Brake Pair Actuators," Dept. of Mechanical Engineering, MIT Feb. 1990, pp. 2-88.

Terry, J. et al., "Tactile Feedback in a Computer Mouse", in: Proceedings of Fourteenth Annual Northeast Bioengineering Conference, University of New Hampshire, Mar. 10-11, 1988, pp. 146-149 (1988).

Minsky, M., et al., "Feeling and Seeing: Issues in Force Display," in: Proc. Symposium on Interactive 3D Graphics, Snowbird, UT, 1990, 1990 ACM 089791-351-5, pp. 235-242, 270, (1990). (NPL documents found in U.S. Appl. No. 12/623,685).

Minsky, M., "Computational Haptics: The Sandpaper System for Synthesizing Texture for a Force-Feedback Display," Ph.D. Dissertation, Massachusetts Institute of Technology, Cambridge, MA, (Jun. 1995), 217 pages.

Noll, A., "Man-Machine Tactile," reprint of SID Journal (The Official Journal of the Society for Information Display), vol. 1, No. 2, pp. 5-11, 30, (Jul./Aug. 1972).

O'Modhrain, M.S., "Playing by Feel: Incorporating Haptic Feedback into Computer-Based Musical Instruments," PhD Thesis, Stanford University, (2000), pp. 1-107.

Traunmiiller, H., "The Sentiphone, a tactual speech communication aid," Journal of Communications Disorders, vol. 13, May 1980, pp. 183-193. (NPL documents found in U.S. Appl. No. 12/623,685).

Tremblay, M. R. et al., "Whole-Hand Interaction with 3D Environments", Workshop on Perceptual User Interfaces, four unnumbered pages, Nov. 5, 1998, 4 pages.

Weiler, M. et al., "Direct Volume Rendering in OpenSG," Computers & Graphics 28, 2004, pp. 93-98.

Wiker, S. F., "Teletouch Display Development: Phase 1 Report," Naval Ocean Systems Center, Technical Report 1230, Jul. 1988, 66 pages.

Yamakita, M. et al., "Tele Virtual Reality of Dynamic Mechanical Model," Proceedings of the 1992 IEEE/RSJ International Conference on Intelligent Robots and Systems, Jul. 7-10, 1992, pp. 1103-1110.

Brooks et al., "Hand Controllers for Teleoperation a State-of-the-Art Technology Survey and Evaluation," JPL Publication 85-11; NASA-CR-175890; N85-28559, pp. 1-84, (Mar. 1, 1985).

Brooks, Frederick P. et al., "Project GROPE—Haptic Displays for Scientific Visualization," Computer Graphics, vol. 24, No. 4, Aug. 1990, pp. 177-185.

Burdea et al., "Distributed Virtual Force Feedback," Lecture Notes for Workshop on Force Display in Virtual Environments and its Application to Robotic Teleoperation, IEEE, May 2, 1993, pp. 25-44.

Buttolo, P., "Hard Disk Actuators for Mini Teleoperation," Telemanipulator and Telepresence Technologies Symposium (1994) pp. 55-61.

(56) References Cited

OTHER PUBLICATIONS

Calder, B., "Design of a Force-Feedback Touch-Inducing Actuator for Teleoperator Robot Control," Thesis (B.S.)—Massachusetts Institute of Technology, Dept. of Mechanical Engineering, Cambridge, MA, (1983), 37 pages.

Caldwell, D., et al, "Enhanced Tactile Feedback (Tele-Taction) Using a Multi-Functional Sensory System," Proceedings of the 1993 IEEE International Conference on Robotics and Automation: vol. 1, Atlanta, GA, IEEE Computer Society Press, pp. 955-960, (1993).

Carreras, R. "Introducing a Revolutionary Moving Magnet Linear Motor," www.enduratec.com, (2003), 5 pages.

Chang, A. et al., "Audio-Haptic Feedback in Mobile Phones", Proceedings of ACM CHI 2005 Conference on Human Factors in Computing Systems, Apr. 2-7, 2005, Portland, Oregon, pp. 1264-1267, (2005).

Dachille IX, F., et al., "Haptic Sculpting of Dynamic Surfaces," In the Proceedings of Symposium on Interactive 3D Graphics, pp. 103-110, (1999).

du Lake, Sir Launcelot, "Cyberman from Logitech," at http://www.ibiblio.org/GameBytes/Issue21/greviews/cyberman.html, (1994), 2 pages.

Eberhardt, Silvio P. et al., "OMAR—A Haptic Display for Speech Perception by Deaf and Deaf-Blind Individuals," IEEE, (1993), pp. 195-201.

Eberhardt, Silvio P. et al., "Inducing Dynamic Haptic Perception by the Hand: System Description and Some Results," Proceedings of ASME Dynamic Systems and Control, vol. DSC-55-1, No. 1, (1994), pp. 345-351.

Erikson, Carl, "Polygonal Simplification: An Overview," Dept. of Computer Science, TR96-016, 1996, pp. 1-32.

ESA (European Space Agency), "Automation and Robotics", pp. 21-23, Sep. 15, 2000.

Gillespie, B., "The Touchback Keyboard," In International Computer Music Conference (ICMC) Proceedings, San Jose, CA, pp. 447-448, (1992).

Gillespie, B., "The Virtual Piano Action: Design and Implementation," in: Proceedings of International Computer Music Conference, Auhus, Denmark, pp. 167-170, (1994).

Gobel, M., et al., "Tactile Feedback Applied to Computer Mice," International Journal of Human-Computer Interaction, vol. 7, No. 1, pp. 1-24, (1995).

Gotow, J.K. et al, "Controlled Impedance Test Apparatus for Studying Human Interpretation of Kinesthetic Feedback," Proceedings of the 1989 American Control Conference, Pittsburgh, PA, Jun. 21-23, 1989, pp. 332-337, (1989).

Hac, A., et al., "Synchronization in Multimedia Data Retrieval," vol. 7 International Journal of Network Management, 33-62, (1997).

Hardman, L., et al., "Do You Have the Time? Composition and Linking in Time-based Hypermedia," Proceedings of the 10th ACM Conference on Hypertext and Hypermedia, Darmstadt, Germany, pp. 189-196, (Feb. 21-25, 1999).

Hirose, M. et al., "Development of Haptic Interface Platform (HIP)", Journal of the Virtual Reality Society of Japan, vol. 3, No. 3, pp. 111-119, Sep. 30, 1998 (english abstract).

Howe, Robert D., "A Force-Reflecting Teleoperated Hand System for the Study of Tactile Sensing in Precision Manipulation," Proceedings of the 1992 IEEE International Conference on Robotics and Automation, vol. 2, (1992), pp. 1321-1326.

Hudson, T., et al, "VCOLLIDE: Accelerated Collision Detection for VRML," in: Proceedings of the 2nd Annual Symposium on the Virtual Reality Modeling Language (VRML 97), Monterey, CA, USA, pp. 117-124, (1997).

IBM Corporation, "Mouse Ball-actuating Device with Force and Tactile Feedback," vol. 32 IBM Technical Disclosure Bulletin No. 9B, pp. 230-235, (Feb. 1990).

"VibeTonz System", Immersion Corporation, (2004), 6 pages.

"VibeTonz Mobile Player", Immersion Corporation, (2005), 4 pages.

"VibeTonz Solution for BREW Develpers", Immersion Corporation, 2005, 2 pages.

"VibeTonz Studio SDK", Immersion Corporation, (2005), 4 pages.

Iwata, H., "Artificial Reality with Force-feedback: Development of Desktop Virtual Space with Compact Master Manipulator," vol. 24 Computer Graphics No. 4, pp. 165-170, (1990).

Iwata, H., "Pen-based Haptic Virtual Environment," in IEEE Annual Virtual Reality International Symposium, pp. 287-292, IEEE Service Center, Seattle, WA, 0-7803-1363-1/93 IEEE, (1993).

Jackson, K. M., "Linearity of Radio-Frequency Transducers," Medical and Biological Engineering and Computer, Jul. 1977, pp. 446-449.

Jacobsen, Stephen C. et al., "High Performance, Dextrous Telerobotic Manipulator With Force Reflection," Intervention/ROV '91 Conference & Exposition, Hollywood, Florida, May 21-23, 1991, pp. 213-218.

Johnson, David A., "Shape-Memory Alloy Tactical Feedback Actuator," Tini Allow Company, Inc., Aug. 1990, 2 pages, pp. i-33.

Jones, L. et al., "A Perceptual Analysis of Stiffness," 79 Experimental Brain Research No. 1, pp. 151-156, (1990).

Kaczmarek, K. A. et al. "Tactile Displays," in: Virtual Environments and Advanced Interface Design, New York: Oxford University Press, (1995), pp. 349-414.

Kashani, R., "Tuned Mass Dampers and Vibration Absorbers," www.deicon.com, Apr. 2004, pp. 1-5.

Kelley, A., et al., "On the Development of a Force-Feedback Mouse and Its Integration into a Graphical User Interface," in: Symposium on Haptic Interfaces for Virtual Environment and teleoperator Systems, 1994 International Mechanical Engineering Congress and Exhibition, Chicago, IL, Nov. 1994, 8 pages.

Kirman, Jacob H., "Tactile Perception of Computer-Derived Formant Patterns From Voiced Speech," J. Acoust. Soc. Am., vol. 55, No. 1, Jan. 1974, pp. 163-169.

Kontarinis, D., et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Kontarinis, D., et al., "Tactile Display of Vibratory Information in Teleoperation and Virtual Environments," PRESENCE, vol. 4, No. 4, pp. 387-402, (1995).

Logitech Developer Support, "Logitech Cyberman SWIFT Supplement, Revision: 1.0," Logitech Inc., Fremont, CA, pp. iii-29, (Apr. 5, 1994).

MacLean, K. E., "The Haptic Camera: A Technique for Characterizing and Playing Back Haptic Properties of Real Environments," Interval Research Corporation, (1996), 9 pages.

MacLean, K.et al, "An Architecture for Haptic Control of Media," in: The Proceedings of the ASMA Dynamic Syatems and Control Division: 1999 International Mechanical Engineering Congress and Exposition, Eighth Annual Symposium on Haptic Interfaces for Virtual Environment and Teleoperator Systems, Nashville, TN., pp. 1-10, (Nov. 14-19, 1999).

Marcus, "Touch Feedback in Surgery," Official Proceedings of Virtual Reality and Medicine The Cutting Edge, pp. 96-97, (1994).

McAffee, Douglas A. et al, "Teleoperator Subsystem/Telerobot Demonstrator: Force Reflecting Hand Controller Equipment Manual," JPL D-5172, Jet Propulsion Laboratory, California Institute of Technology, Pasadena, CA, Jan. 1988, pp. 1-C36.

HAPTIC FEEDBACK SENSATIONS BASED ON AUDIO OUTPUT FROM COMPUTER DEVICES

CROSS-REFERENCE TO RELATED APPLICATIONS

This application is a continuation application of U.S. patent application Ser. No. 12/623,685, filed on Nov. 23, 2009 (herein incorporated by reference), which is a continuation application of U.S. patent application Ser. No. 09/974,759, filed on Oct. 9, 2001, now U.S. Pat. No. 7,623,114 (herein incorporated by reference).

FIELD

The present invention relates generally to systems for allowing humans to interface with computer systems, and more particularly to methods for providing haptic feedback to the user interfacing with one or more computer applications involving sound output.

BACKGROUND

A user can interact with an environment displayed by a computer to perform functions and tasks on the computer, such as playing a game, experiencing a simulation or virtual reality environment, using a computer aided design system, operating a graphical user interface (GUI), navigate web pages, etc. Common human-computer interface devices used for such interaction include a mouse, joystick, trackball, gamepad, remote control, steering wheel, stylus, tablet, pressure-sensitive sphere, or the like, that is in communication with the computer system controlling the computer environment. The computer updates the environment in response to the user's manipulation of a physical manipulandum such as a joystick handle, button, or mouse, and provides visual and audio feedback to the user utilizing the display screen and audio speakers. The computer senses the user's manipulation of the user object through sensors provided on the interface device that send locative signals to the computer.

In some interface devices, kinesthetic force feedback and/or tactile feedback is also provided to the user, more generally known collectively herein as "haptic feedback." These types of interface devices can provide physical sensations which are felt by the user manipulating a user manipulandum of the interface device. One or more motors or other actuators are coupled to the manipulandum and are connected to the controlling computer system. The computer system controls forces on the manipulandum in conjunction and coordinated with computer events and interactions by sending control signals or commands to the actuators. The computer system can thus convey physical force sensations to the user in conjunction with other supplied feedback as the user is grasping or contacting the interface device or manipulatable object of the interface device.

The audio feedback provided to the user is an inherent part of many application programs, especially games. Some existing haptic feedback devices are designed to provide haptic sensations based directly on the sound output from the computer. The sound output waveform is directly routed to the interface device so that tactile sensations, such as vibrations, are based directly on the sound output waveform or a filtered portion thereof, much like the way a speaker operates.

A disadvantage of existing haptic sensations based on direct sound waveforms is that the haptic sensations are simple effects based directly on the sound signals. No evaluation or processing of the sound signals is accomplished before sending the signals to the haptic device. This can cause undesirable or disconcerting haptic sensations to be output to the user since not all of the sound output is appropriate for directly translation into haptic sensations.

SUMMARY

The present invention is directed toward triggering the output of haptic sensations based on sound output from a computer device. The output of haptic sensations is intelligently triggered by analyzing sound data for features, allowing an enhanced user experience.

More particularly, an interface device of the present invention provides a method for triggering haptic sensations from sound features detected in sound output from a computer, where the haptic sensations are able to be output to a user of a haptic feedback device in communication with the computer. A portion of sound data is stored that is output to a user as audio from an application program running on the computer. The sound data is stored in a memory buffer of the computer. The portion of sound data is analyzed using intelligent heuristics to extract at least one sound feature from the portion of sound data. The execution of at least one haptic effect is triggered based on the sound feature(s), where the haptic effect is commanded to the haptic feedback device approximately correlated to the output of the portion of sound to the user as audio. The haptic effect causes a haptic sensation to be output to the user.

The triggered haptic sensation is preferably assigned to the sound features found in the sound data. In some embodiments, analyzing the portion of sound data can includes processing the sound data into multiple different frequency ranges and searching for sound features in each of the frequency ranges. A haptic effect can be triggered for each of the frequency ranges if the sound feature is present in that frequency range. Filters can be applied to the sound data, or a fast Fourier transform can be used. Each frequency range can be associated with or mapped to a different haptic sensation. For example, each of the frequency ranges can be associated with a periodic haptic sensation having a different frequency. Other types of haptic sensations can also be mapped and assigned to sound features so that they will trigger upon output of those sound features.

The present invention advantageously allows haptic feedback to be output by a computer system running an application program having sound output. The present invention intelligently assigns haptic sensations to features in the sound data to provide haptic feedback relevant to events in the application program which caused the sound output. This results in an overall improvement in user experience of the haptic feedback based on sound output.

These and other advantages of the present invention will become apparent to those skilled in the art upon a reading of the following specification of the invention and a study of the several figures of the drawing.

DETAILED DESCRIPTION

Figure 1:
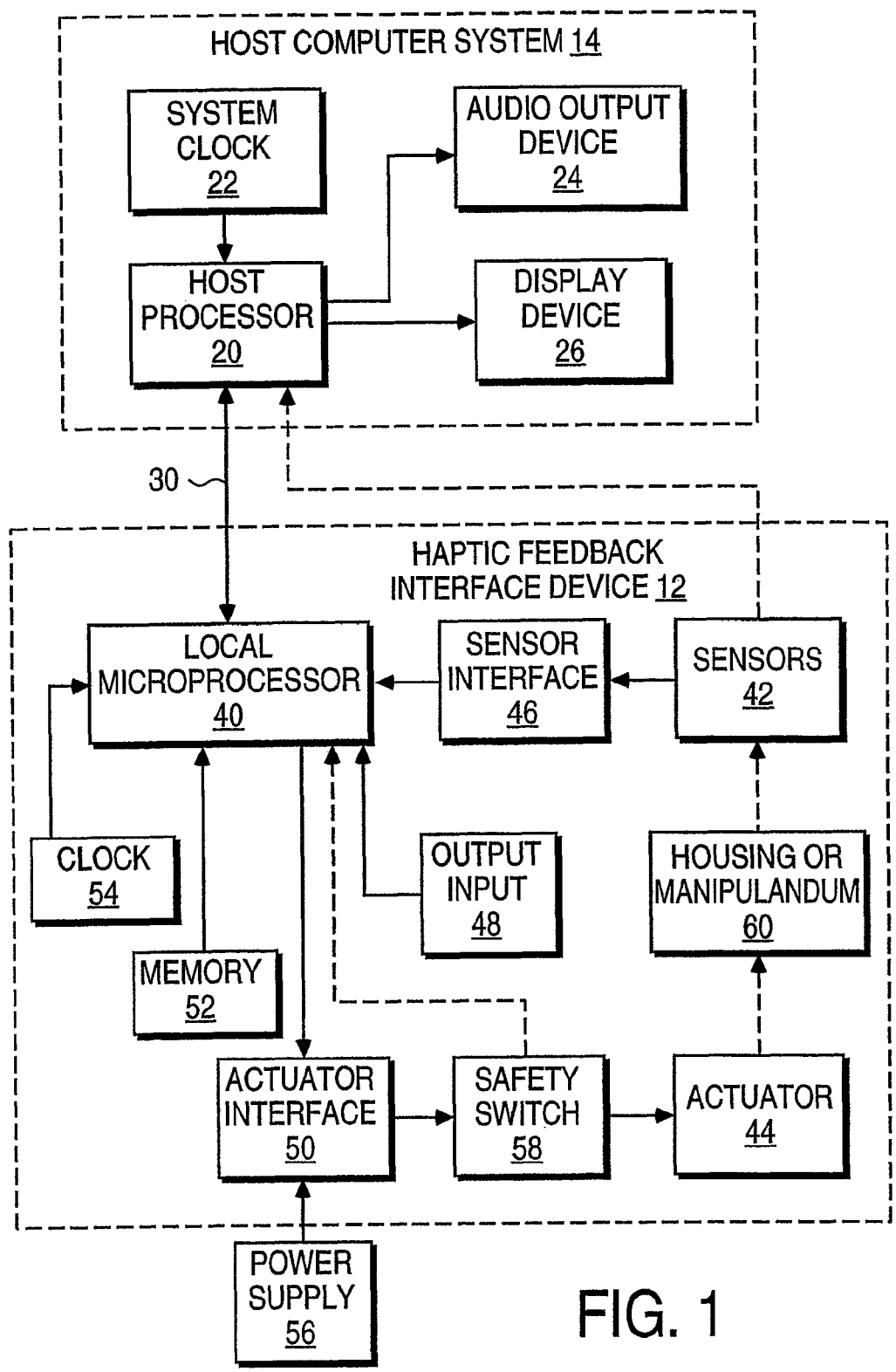
FIG. 1 is a block diagram illustrating one embodiment of a haptic feedback system suitable for use with the present invention.

FIG. 1 is a block diagram illustrating a computer system 10 suitable for use with the present invention, including a haptic feedback interface device 12 in communication with a host computer 14.

Host computer 14 preferably includes a host microprocessor 20, a clock 22, a display screen 26, and an audio output device 24. The host computer also includes other well known components, such as random access memory (RAM), read-only memory (ROM), and input/output (I/O) electronics (not shown). The host computer 14 is a computing device that can take a wide variety of forms. For example, in the described embodiments computer 14 is a personal computer or workstation, such as a PC compatible computer or Macintosh personal computer, or a Sun or Silicon Graphics workstation. Such a computer 14 can operate under the Windows™, MacOS™, Unix, MS-DOS, or other operating system. Alternatively, host computer 14 can be one of a variety of home video game console systems commonly connected to a television set or other display, such as systems available from Nintendo, Sega, Sony, or Microsoft. In other embodiments, host computer 14 can be a "set top box", a "network-" or "internet-computer", a portable computer or game device, personal digital assistant (PDA), etc.

Host computer 14 preferably implements a host application program with which a user is interacting via device 12 and other peripherals, if appropriate. In the context of the present invention, the host application program is a digital audio editing program, as described in greater detail below. Other application programs that utilize input of device 12 and output haptic feedback commands to the device 12 can also be used. The host application program preferably utilizes a graphical user interface (GUI) to present options to a user and receive input from the user. This application program may include the haptic feedback functionality described below; or, the haptic feedback control can be implemented in another program running on the host computer, such as a driver or other application program. Herein, computer 14 may be referred as providing a "graphical environment,", which can be a graphical user interface, game, simulation; or other visual environment. The computer displays "graphical objects" or "computer objects," which are not physical objects, but are logical software unit collections of data and/or procedures that may be displayed as images by computer 14 on display screen 26, as is well known to those skilled in the art. Suitable software drivers which interface software with haptic feedback devices are available from Immersion Corporation of San Jose, Calif.

Display device 26 can be included in host computer system 14 and can be a standard display screen (LCD, CRT, flat panel, etc.), 3-D goggles, projection device, or any other visual output device. Display device 26 displays images as commanded by an operating system application, simulation, game, etc.

Audio output device 24, such as speakers, provides sound output to user. In the context of the present invention, other audio-related devices may also be coupled to the host computer, such as stereo receivers, amplifiers, etc. Other types of peripherals can also be coupled to host processor 20, such as storage devices (hard disk drive, CD ROM drive, floppy disk drive, etc.), printers, and other input and output devices.

The haptic feedback interface device 12, such as a mouse, knob, gamepad, trackball, joystick, remote control unit, PDA screen, etc., is coupled to host computer 14 by a bi-directional bus 30. The bi-directional bus sends signals in either direction between host computer 14 and the interface device. Bus 30 can be a serial interface bus, such as an RS232 serial interface, RS-422, Universal Serial Bus (USB), MIDI, or other protocols well known to those skilled in the art; or a parallel bus or wireless link. Some interfaces can also provide power to the actuators of the device 12.

Device 12 can include a local processor 40. Local processor 40 can optionally be included within the housing of device 12 to allow efficient communication with other components of the mouse. Processor 40 can be provided with software instructions to wait for commands or requests from computer host 14, decode the command or request, and handle/control input and output signals according to the command or request. In addition, processor 40 can operate independently of host computer 14 by reading sensor signals and calculating appropriate forces or commands from those sensor signals, time signals, and stored or relayed instructions selected in accordance with a host command. Suitable microprocessors for use as local processor 40 include the MC68HC711E9 by Motorola, the PIC16C74 by Microchip, and the 82930AX by Intel Corp., for example, as well as more sophisticated force feedback processors such as the Immersion Touchsense Processor. Processor 40 can include one microprocessor chip, multiple processors and/or co-processor chips, and/or digital signal processor (DSP) capability.

Microprocessor 40 can receive signals from sensor(s) 42 and provide signals to actuator 44 in accordance with instructions provided by host computer 14 over bus 30. For example, in a local control embodiment, host computer 14 provides high level supervisory commands to processor 40 over bus 30, and processor 40 decodes the commands and manages low level force control loops to sensors and the actuator in accordance with the high level commands and independently of the host computer 14. This operation is described in greater detail in U.S. Pat. Nos. 5,739,811 and 5,734,373, both incorporated herein by reference. In the host control loop, force commands from the host computer instruct the processor to output a force or force sensation having specified characteristics. The local processor 40 reports locative and other sensor data to the host computer which the host computer uses to update executed programs. In the local control loop, actuator signals are provided from the processor 40 to actuator 44 and sensor signals are provided from the sensor 42 and other input devices 48 to the processor 40. The processor 40 can process inputted sensor signals to determine appropriate output actuator signals by following stored instructions. Herein, the term "haptic sensation" or "tactile sensation" refers to either a single force or a sequence of forces output by the actuator which provide a sensation to the user. The term "haptic effect" generally refers to the commands, parameters, and/or data sent to the device that define a haptic effect and which results in a haptic sensation when the effect is output as forces to the user by the device.

In yet other embodiments, other simpler hardware can be provided locally to device 12 to provide functionality as processor 40. For example, a hardware state machine or ASIC incorporating fixed logic can be used to provide signals to the actuator 44 and receive sensor signals from sensors 42, and to output tactile signals according to a predefined sequence, algorithm, or process.

In a different, host-controlled embodiment, host computer 14 can provide low-level force commands over bus 30, which are directly transmitted to the actuator 44 via processor 40. Host computer 14 thus directly controls and processes all signals to and from the device 12. In the simple host control embodiment, the signal from the host to the device can command the actuator to output a force at a predefined frequency and magnitude, or can include a magnitude and/or a direction, or be a simple command that indicates a desired force value to apply over time.

Local memory 52, such as RAM and/or ROM, is preferably coupled to processor 40 in device 12 to store instructions for processor 40 and store temporary and other data. For example, force profiles can be stored in memory 52, such as a sequence of stored force values that can be output by the processor, or a look-up table of force values to be output based on the current position of the user object. In addition, a local clock 54 can be coupled to the processor 40 to provide timing data, similar to the system clock of host computer 14; the tithing data might be required, for example, to compute forces output by actuator 44 (e.g., forces dependent on calculated velocities or other time dependent factors). In embodiments using the USB communication interface, timing data for processor 40 can be alternatively retrieved from the USB signal.

Sensors 42 sense the position or motion of the device and/or one or more manipulandums or controls and provides signals to processor 40 (or host 14) including information representative of the position or motion. Sensors suitable for detecting manipulation include digital optical encoders, optical sensor systems, linear optical encoders, potentiometers, optical sensors, velocity sensors, acceleration sensors, strain gauge, or other types of sensors can also be used, and either relative or absolute sensors can be provided. Optional sensor interface 46 can be used to convert sensor signals to signals that can be interpreted by the processor 40 and/or host 14.

Actuator(s) 44 outputs haptic sensations by transmitting forces to the housing or one or more manipulandums of the device 12 in response to signals received from processor 40 and/or host computer 14. Actuator 44 can be any of many types of actuators, including active actuators such as DC motors, voice coils, pneumatic or hydraulic actuators, torquers, piezoelectric actuators, moving magnet actuators, etc., or passive actuators such as brakes.

Actuator interface 50 can be optionally connected between actuator 44 and processor 40 to convert signals from processor 40 into signals appropriate to drive actuator 44. Interface 50 can include power amplifiers, switches, digital to analog controllers (DACs), analog to digital controllers (ADCs), and other components, as is well known to those skilled in the art. Other input devices 48 are included in device 12 and send input signals to processor 40 or to host 14 when manipulated by the user. Such input devices can include buttons, scroll wheels, d-pads, dials, switches, or other controls or mechanisms.

Power supply 56 can optionally be included in device 12 coupled to actuator interface 50 and/or actuator 44 to provide electrical power to the actuator, or be provided as a separate component. Alternatively, power can be drawn from a power supply separate from device 12, or be received across the bus 30. Also, received power can be stored and regulated by device 12 and thus used when needed to drive actuator 44 or used in a supplementary fashion. Some embodiments can use a power storage device in the device to ensure that peak forces can be applied (as described in U.S. Pat. No. 5,929,607, incorporated herein by reference). Alternatively, this technology can be employed in a wireless device, in which case battery power is used to drive the tactile actuators. A safety switch 58 can optionally be included to allow a user to deactivate actuator 44 for safety reasons.

Many types of interface or control devices may be used with the present invention described herein. For example, such interface devices can include a haptic feedback trackball, joystick handle, steering wheel, knob, handheld remote control device, gamepad controller for video games or computer games, stylus, grip, wheel, button, cellular phone, PDA, touchpad, or other manipulatable object, surface, or housing.

Figure 2:
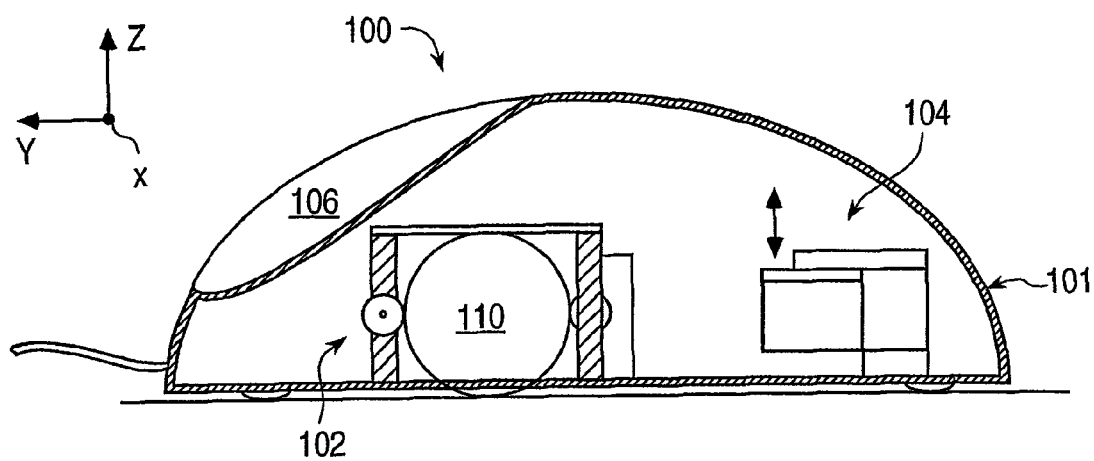
FIG. 2 is a side cross-sectional view of a mouse embodiment of the haptic feedback device suitable for use with the present invention.

FIG. 2 is a side cross-sectional view of a mouse embodiment 100 of device 12 for use with the present invention.

Mouse device 100 includes a housing 101, a sensing system 102, and an actuator 104. Housing 101 is shaped to fit the user's hand like a standard mouse while the user moves the mouse in the planar degrees of freedom and manipulates the buttons 106. Other housing shapes can be provided in many different embodiments.

Sensor 102 detects the position of the mouse in its planar degrees of freedom, e.g. along the X and Y axes. In the described embodiment, sensor 102 includes a standard mouse ball 110 for providing directional input to the computer system. Alternatively, an optical sensor or other type of sensor can be used.

Mouse device 100 includes one or more actuators 104 for imparting haptic feedback such as tactile sensations to the user of the mouse. Actuator 104 is coupled to the housing 101 to provide haptic feedback to the user. In one embodiment, the actuator is coupled to an inertial mass that is moved by the actuator. Inertial forces caused by the motion of the inertial mass are applied to the housing of the mouse with respect to the inertial mass, thereby conveying haptic feedback such as tactile sensations to the user who is contacting the housing. Some embodiments allow the actuator to move itself as the inertial mass. Such embodiments are described in greater detail in U.S. Pat. No. 6,211,861 and U.S. application Ser. No. 09/585,741, both incorporated herein by reference. Other types of interface devices, such as gamepads, handheld remote controls, cellular phones, PDA's, etc., can include such an actuator for inertial tactile sensations.

Other types of interface devices and actuators can also be used with the present invention. For example, gamepads, mice, or other devices can include an eccentric rotating mass coupled to a rotating shaft of an actuator to provide inertial tactile sensations on the housing or manipulandum of the device. Other types of haptic devices can provide kinesthetic force feedback, such as joysticks, knobs, scroll wheels, gamepads, steering wheels, trackballs, mice, etc., in which forces are output in the sensed degree(s) of freedom of a manipulandum. For example, embodiments of a kinesthetic mouse haptic device are disclosed in U.S. Pat. Nos. 6,100,874 and 6,166,723, both incorporated herein by reference in their entireties.

Sound Output with Haptic Feedback

The present invention improves the user experience in the output of haptic sensations coordinated with the sound output of one or more application programs (or other programs) running on the host computer.

The preferred embodiment of the present invention provides haptic effects for output to a haptic feedback device based on sound signals or data output by a host computer and which are output as haptic sensations to the user. In some alternate embodiments, the haptic effects can be similarly provided based on features in sound signals or data input to a computer system, e.g. from a microphone or audio device. Temporal features and characteristics of sound are identified and mapped to or associated with preprogrammed haptic effects. The haptic sensations based on these haptic effects can be rendered immediately on haptic feedback device 12, or can be stored in memory to form a "haptic profile" of a given sound. The method of the present invention is not to simply route sound signals directly to a haptic device for output as haptic sensations, as is done in the prior art, but to associate a variety of high-level sound features with a variety of high-level haptic sensations, using the sound features to trigger the output of the appropriate haptic sensations.

An important advantage of the present invention is that compelling haptic sensations are provided for any program that outputs sounds for a variety of events in that application program, e.g. games, without a software application developer having to expend effort in programming the haptic effects in the program. Thus, any game program off the shelf can be easily made to work with haptic feedback devices regardless of whether the game includes code to control haptic devices or whether it was only developed for non-haptic-feedback devices, allowing the user a more compelling interactive and immersive experience with a wide variety of programs. Furthermore, the present invention can approximately distinguish between types of sound effects and associate different haptic sensations with different events, allowing a more rich experience for the user.

In one embodiment, a low-level driver program running on the host computer performs the methods of the present invention. In other embodiments, other levels of software running on the host (or on a microprocessor of the haptic feedback device) can perform some or all of the features or steps of the present invention (application program, API, etc.). Program instructions for implementing the present invention can be stored as hardware (e.g. logic components) or software stored on a computer readable medium, such as electrical memory, magnetic disk, optical disk, magnetic tape, etc.

Figure 3:
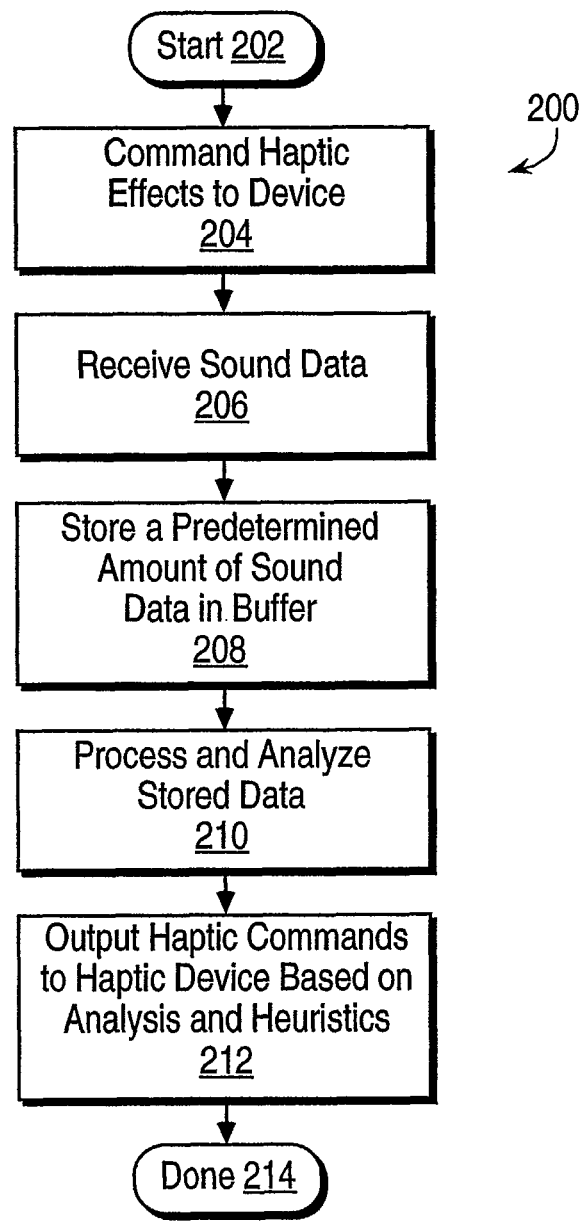
FIG. 3 is a flow diagram illustrating a first embodiment of a method of the present invention for providing haptic effects to be output as haptic sensations based on provided sound data.

FIG. 3 is a flow diagram illustrating a first embodiment 200 of a method of the present invention for providing haptic effects to be output as haptic sensations based on given sound data or sound signal. The method starts at 202, and in optional step 204, haptic effects are commanded to the device and not yet output to the user. For example, the haptic device 12 can include local memory that allows the device to store data for a number of different haptic effects. The haptic effects resident in the device memory can be played when a host command is received or based on other conditions (a predetermined time period has passed, etc.). The data sent to the device can include parameters for the haptic effects; e.g., for a periodic vibration effects, the parameters can include a frequency, duration, and magnitude. The effects can be loaded to the device in step 204 and in some embodiments can be commanded to play, e.g. at a magnitude of zero, in preparation to be commanded to higher magnitudes at a later step. Step 204 is most appropriate for those embodiments in which the same set of haptic sensations are always output to the user. In other embodiments, haptic effects can be commanded at the time they are to be output to the user.

In next step 206, sound data is received from an application program or other software layer or program running on the host computer, or alternately, direction from an external audio device. The sound data is preferably digital data that can be in any standardized format, such as MIDI, digital sound samples in a way file, an mp3 file, etc. The sound data is received in step 206 when it is also to be routed to an audio output device such as speakers and output to the user as sound. Typically, the sound data is generated by the application program from a sound event occurring in the application, such as a sound effect in a game resulting from game actions or events, music in a game or other application program playing after a game starts or other event occurs, a beep in a graphical user interface interaction, the playing of music from a CD or DVD, or other sound event. In the described embodiment, the sound data received at this step to be analyzed is currently being output by speakers to the user. Thus, by the time the sound data is processed and haptic sensations output as described below, the sound data has already been output to the user. However, since a small amount of sound data is stored, only a delay of milliseconds occurs between sound and haptic output, which the user cannot discern. In other embodiments in which the sound data output is known in advance, haptic sensations can be output simultaneously, or close to simultaneously, with the sound data that triggered them.

In step 208, a predetermined amount of the received sound data is stored in a temporary buffer in the memory of the host computer 14. In one embodiment, this is an amount of data reasonably small enough to allow quick processing and associating with haptic sensations, while large enough to permit meaningful processing and analysis. In one embodiment, a portion of sound data equivalent to about 10 ms of play is stored, although different amounts can be stored in other embodiments. For example, the sound can be digitally recorded in a 10 ms segment using DirectSound or other sound capture API on the host computer.

In step 210, the stored sound data is processed and analyzed to identify particular sound characteristics or features which have been designated as relevant in the determination of which haptic sensations are to be output, i.e. these sound features are to act as cues to trigger the output of haptic sensations. In broad terms, the present invention uses intelligent heuristics to extract sound features that are likely to have meaning in an application program and to associate such sound features with predetermined, preprogrammed haptic sensations that correspond appropriately with the extracted sound features and the likely events these features represent. For example, likely events in many current video game applications may be explosions from bombs, grenades, missiles, etc., the firing of a weapon such as a gun or rocket, the crash of a vehicle, the patter of footsteps, the sound of an object splashing into water, an alert sound for alerting the player to some game event, etc. These events may have particular sound features which can be recognized from the received sound data after appropriate analysis.

A variety of different ways can be employed to process the data; some embodiments are described below with respect to FIGS. 4 and 5. These particular embodiments perform processing on the sound data to divide the waveform represented by the sound data into a number of different frequency ranges according to the present invention. Each frequency range of sound can then be analyzed separately for particular sound features. This frequency range division has the advantage that sounds often occur in different frequency ranges based on the event that triggered the sound; for example, an explosion in a game may have a low frequency sound while a gun shot may have a higher frequency sound. Types of events might therefore be approximately distinguished based on the frequency range in which the sound is located, allowing different haptic effects to be commanded and output as described below.

Once the sound data has been processed and analyzed, in next step 212, haptic commands are output to the haptic device to cause haptic sensations to be output to the user manipulating the device. The haptic commands are triggered based on the sound features, if any, found in the sound data in step 210. Intelligent heuristics can be used to assign different haptic sensations to different types of sounds based, for example, on the frequencies of the sounds or other characteristics of the sounds. The haptic commands can cause device-resident haptic effects to start playing or play at a commanded magnitude. In one embodiment, the haptic effects that are already resident in memory on the device from step 204 are modified with new parameters or data as appropriate to implement the desired haptic sensations. Alternatively, new haptic effects can be created and commanded to be output immediately by the device as haptic sensations. As explained above, the haptic sensations resulting from the commands may be output slightly after the associated sound features have been output as audio, but preferably soon enough so that the user cannot tell that there was a delay.

In one embodiment, the commanded haptic sensations can be set to a magnitude proportional to the sound data magnitude in the associated frequency range. For example, embodiments discussed with reference to FIGS. 4 and 5, the sound data is filtered or organized into 5 different frequency ranges. Each of these frequency ranges can have a different haptic sensation associated with it. For example, using an available inertial tactile feedback mouse, a periodic haptic effect of different frequency is associated with each of the frequency ranges. Thus, for example, a periodic haptic effect having a haptic frequency of 62 Hz (e.g., at or near a first resonance frequency of the haptic device to cause high magnitude sensations) is associated with the first sound frequency range (e.g., 0 Hz to 150 Hz). The other periodic haptic effects can have haptic frequencies of 75 Hz, 90 Hz, 115 Hz, and 250 Hz, each corresponding to another sound frequency range in ascending order (other periodic frequencies can be used in other embodiments). The magnitudes of each of these periodic haptic effects can be set to a value proportional to the magnitude of the sound data in the associated frequency range. A running average of magnitude of ambient sound levels can be used as a minimum threshold for haptic effect generation, e.g. if the sound signal for a particular frequency range has a higher magnitude than the threshold, then a haptic effect associated with that frequency range can be commanded to be output or can be commanded to have a magnitude above a zero level.

The method presented above thus varies the magnitudes of five different haptic effects based on the corresponding varying magnitudes in different frequency ranges of the sound signal represented by the sound data. With some sounds that have components in all the frequency ranges, this may cause five different haptic effects to be output at once. However, since many sound features that are spread across several frequency ranges last for a short amount of time, the user perceives only a short vibration or series of pulses rather than a mush of different frequencies. Other more sustained sound effects may be concentrated in only one or two frequency ranges which will cause only one or two haptic effects to be output simultaneously (the haptic effects for the other frequency ranges will be set to zero magnitude). The user will thus feel a haptic sensations that roughly corresponds to the sound effect's frequency. This is also discussed with respect to FIG. 4.

Thus, the amplitude of a haptic sensation that is associated with a particular frequency range or band can correspond directly with the magnitude level of a sound signal in that frequency band, as explained above. In addition to this continuous haptic output, sudden spikes of amplitude in the sound signal can be mapped to additional jolts, pulses, or other short, strong haptic sensations which can be overlaid on the continuous vibration sensations.

In other embodiments, more sophisticated haptic sensations can be output based on the sound data processing and analysis of step 210 and based on intelligent heuristics. In many applications such as games, the type of sound may be able to be determined based which frequency ranges it is primarily located. This allows a more sophisticated mapping scheme, where completely different haptic sensations can be mapped to different sound frequency ranges. This is also discussed with respect to FIG. 5.

For example, it is often the case that weapon fire in a video game application is associated with a sudden burst of high frequency sound. Using this fact as an intelligent heuristic, in step 210 the sound output data from the game can be analyzed and a feature that indicates that a high frequency sound has been output identified. For example, a particular frequency range can be checked for a sudden burst or spike in amplitude of sound. In step 212, a haptic sensation associated with weapon fire can be intelligently commanded to be output based on the sound burst found in the sound. In some embodiments, the haptic sensation can be modified on the fly while the sound and the haptic sensations are playing, where the magnitude and duration of the haptic sensation is continually adjusted based on the magnitude of the sound burst above a predetermined threshold, the duration of the burst, and/or the specific frequency content of the burst.

In some embodiments, a completely different haptic profile can be selected for a sound feature based on the specifics of the sound feature, where a pre-programmed mapping between sound characteristics and haptic effects is consulted (e.g., a look-up table or data table can be stored in memory). For example, a sound burst in a very different frequency range might trigger a completely different haptic sensation. A low frequency sound burst in a video game might be, for example, the sound of a footstep of a character. An appropriate haptic sensation can be mapped to that sound feature, such as a low-frequency vibration or undulating force.

Some games or other programs may output similar sound effects for similar events to allow approximate mapping as discussed above. Other games and programs, however, may have different events associated with similar-sounding sounds. Therefore, in one embodiment, a particular look-up table or other mapping data can be associated with each individual game (or other application program). Using the table, the method of the present invention can identify on the table which game is playing and then find the appropriate mapping between sound characteristics of that game and haptic sensations that have been assigned by the table's author. This allows for tuning of the heuristics tailored for specific games, enabling more accurate mappings. This can be advantageous to developers, who will not have to put haptic effects or mappings in their games themselves, but can rely on the manufacturers of the haptic devices to put out driver updates including haptic mappings for games currently available based on the sound output.

In alternate embodiments, the haptic effects that are associated with the found sound features are not immediately output as haptic-sensations to the user, but are instead stored in memory to form a "haptic profile" of a given sound. This can be used to assist in the design of haptic effects. For example, a sound file can be loaded and the user can select a control in a graphical user interface to cause the method of the present invention to generate a compound haptic effect that corresponds to the sound. The generated haptic effect (or haptic magnitudes, force values, etc.) can be then used in a program by commanding the generated compound haptic effect. Alternatively, the haptic profile (generated effect) can become a new haptic effect primitive to allow developers to create new effects based on this primitive, e.g. periodic effects, textures, temporal profiles, etc. can be created.

For example, a game may have hundreds of sound effects. The method of the present invention can be instructed to load the game's sound files and create haptic effects from the sound data in a standardized format (such as .ifr files, used in protocols created by Immersion Corp. of San Jose, Calif.) in a few seconds. Thus, a developer need not create each haptic effect manually, saving great amount of development time. A designer could also examine the generated haptic effects and edit them, if desired. This is advantageous to developers who wish to add code to their games to command haptic effects to haptic devices in the traditional way, but who do not wish to spend large amounts of time designing the appropriate haptic effects.

After the output of the haptic sensation, the method returns to step 206 to check if further sound data is received. If so, a next portion of sound data is processed as discussed above. If no further sound data is received, the process is complete at 242 (to be started again the next time sound data is output).

Figure 4:
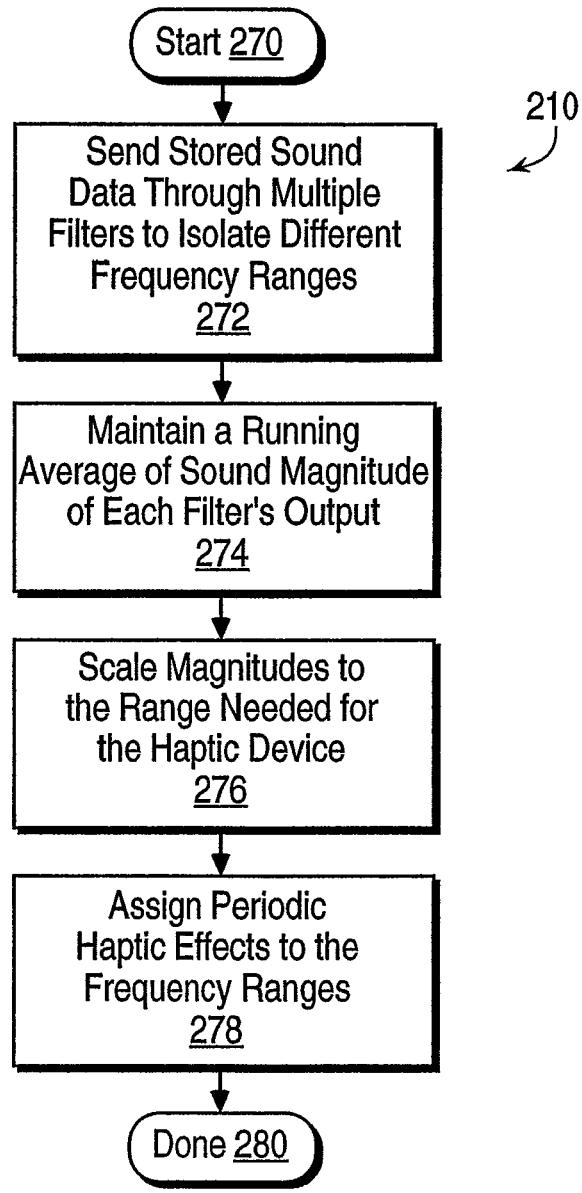
FIG. 4 is a flow diagram illustrating one embodiment for the step of FIG. 3 in which the sound data stored in the buffer is processed and analyzed.

FIG. 4 is a flow diagram illustrating one embodiment for step 210 of FIG. 3, in which the sound data stored in the buffer is processed and analyzed. The method starts at 270, and in step 272, the stored sound data is set through multiple filters to isolate different frequency ranges. For example, to divide the sound data into five frequency ranges as described in the example above, a low-pass filter, a high-pass filter, and three bandpass filters can be employed. As one example, the low-pass filter can filter out all data in the frequencies outside 0-170 Hz, the first bandpass filter can filter out all frequencies except 170-430 Hz, the second bandpass filter can filter out all frequencies except 430 Hz-2 kHz, the third bandpass filter can filter out all frequencies except 2-10 kHz, and the high-pass filter can filter out all frequencies lower than 10 kHz.

In step 274, a running average of the sound magnitude from each of the filter outputs is maintained. This allows ambient sounds output from the computer to be averaged out so that only sounds louder than the ambient level will trigger haptic sensations. In next step 276, the magnitudes of the filter outputs are scaled to a range that is required for the haptic device 12 that the user is using. Thus, the actual filter outputs are not used to generate haptic sensations as in the prior art, but new haptic commands and effects are created based on the filter outputs.

In some embodiments, the square of each filter's output magnitude can be scaled. This may be more effective in some embodiments to pick out only the larger peaks or spikes in each frequency range of sound data and reduce a sustained rumble/vibration of the device that may occur from too many peaks being detected.

In next step 278, periodic haptic effects are assigned to each of the filter's outputs. The periodic effects can each be assigned a magnitude equal to the scaled magnitude found for each filter. If a filter has no output, i.e. no sound of that frequency range is present in the sound data, or if a filter's output is not above a predetermined threshold amplitude, then the haptic effect assigned to that frequency range would be assigned a magnitude of zero. The periodic sensations can each have one of five haptic frequencies found to be effective in conveying the corresponding sound frequency. Such periodic haptic sensations, such as vibrations, are quite appropriate for tactile devices such as gamepads or mice providing inertial tactile sensations. The vibrations can also be output by kinesthetic feedback devices. Other types haptic sensations can also be output by kinesthetic device embodiments, having magnitudes based on the scaled magnitudes determined above. The type of haptic sensations assigned can be different in different embodiments, such as pops, jolts, springs, damping, etc., can also be output having magnitudes based on the scaled magnitudes; for example, a pre-programmed mapping can be consulted to assign a mapped haptic effect.

The method is then complete at 280. The assigned periodic haptic sensations can be used in the next step 212 of FIG. 3, where haptic sensations are output top the user by commanding the haptic effects to the haptic feedback device.

Figure 5:
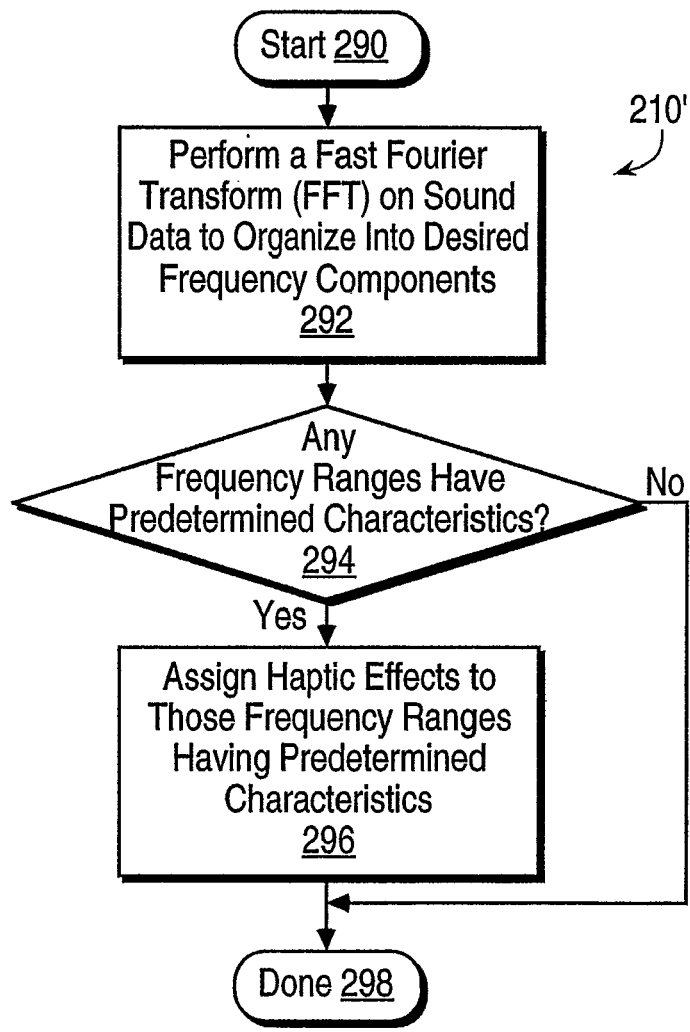
FIG. 5 is a flow diagram illustrating another embodiment for the step of FIG. 3 in which the sound data stored in the buffer is processed and analyzed.

FIG. 5 is a flow diagram illustrating a different embodiment 210' of step 210 of FIG. 3, in which the sound data stored in the buffer is processed and analyzed. The method starts at 290, and in step 292, a Fast Fourier Transform (FFT) is performed on the sound data to filter the data into different frequency components of the data's frequency spectrum. The frequency components each span a frequency range based on the number of components output by the FFT and the entire frequency range covered. For example, if the FFT has 512-outputs, and the entire frequency range of the sound data is about 22 kHz, the each FFT output frequency component has a frequency range of 22 kHz/512=about 43 Hz. These frequency components can then be grouped to sum to desired frequency ranges. For example, to achieve the five frequency ranges similar to the embodiment of FIG. 4, four components can be combined to cover the first frequency range of 0-170 Hz, 6 components cover the range 170-430 Hz, 37 components cover the range 430 Hz-2 kHz, 185 components cover the range 2 kHz-10 kHz, and 256 components cover the range 10-22 kHz. Other frequency ranges and components can be used in other embodiments.

In next step 294, the method checks whether any of the frequency ranges grouped in step 292 have predetermined characteristics. These characteristics are features in the sound data that are significant enough to trigger the output of haptic sensations. In one embodiment, an average amplitude is maintained for each frequency range, and a spike in the amplitude is looked for. If a spike in amplitude of 3-4 times the average amplitude is found, then that is deemed significant and a haptic effect should be assigned to or triggered by that feature.

If predetermined characteristics are found, then the process continues to step 296 to assign haptic effects to those frequency ranges having the predetermined characteristics, and the process is complete at 298 and the method returns to step 212 of FIG. 3. If in step 294 no frequency ranges are found to have the desired characteristics, then the process is complete at 298 and the method returns to step 212 of FIG. 3.

The haptic effects that are assigned to the frequency ranges having the desired characteristics can be any of several different types and/or have different parameters, and need not have a magnitude proportional to the amplitude of the corresponding sound data. For example, a jolt, pulse, or detent can be mapped to any extracted sound features (such as rise in amplitude). The magnitude of the jolt or detent can be based on the frequency range in which the amplitude spike was found, e.g. lower frequency ranges can be assigned higher magnitude haptic sensations (or vice-versa). Periodic sensations, directional sensations (for haptic devices able to output forces in particular directions in degrees of freedom of the device), spring sensations, damping sensations, etc. can be mapped to the different frequency ranges. In one embodiment, a haptic sensation can be increased in magnitude corresponding to the increased sound data amplitude, then the haptic amplitude can be ramped down automatically back to a zero level. Again, a pre-programmed mapping between sound features and haptic sensations can be consulted.

The FFT outputs of the embodiment of FIG. 5 tend to be more efficient and provide more information than the filter outputs of the embodiment of FIG. 4. For example, FFT's can provide more detailed frequency information about where a spike in amplitude occurs, the phase offset of waves or features in the sound signal, etc. It should also be noted that the assigning or triggering of different types of haptic sensations described above for FIG. 5 can also be performed in the embodiment of FIG. 4, and the magnitudes of haptic sensations proportional to sound amplitudes of FIG. 4 can be performed in the embodiment of FIG. 5.

In some applications, the ambient background sounds, such as background music in game applications, can be ignored so that only sound effects in the game trigger haptic sensations to be output. Often, the sound effect magnitudes are much higher than the background music amplitudes, allowing the sound effects to be found as spikes above an average amplitude. In other circumstances, background music can ignored and sound effects processed by the type of audio data. For example, if the background music is in a MIDI format and the sound effects are .wav files, then MIDI data can be ignored and way data processed by the present invention to provide haptic sensations.

Some embodiments can also allow the user to enter preferences which can adjust how the sound data is analyzed, how the haptic effects are assigned, and how the haptic sensations are output. For example, haptic effect strength, the minimum threshold level of amplitude to recognize a sound feature (e.g., so that background music can be better ignored in a game), etc.

The present invention can also be used in other types of application programs besides games. For example, a user's experience of streaming audio can be enhanced by adding haptic sensations to the audio output, so that if the user is contacting the haptic device while listening to the audio output, features in the audio such as music beats, sustained notes, features of speech etc. can be haptically experienced by the user. Likewise, the present invention can be used with a sound track that is output with streaming video, e.g. over a network such as the Internet.

While this invention has been described in terms of several preferred embodiments, it is contemplated that alterations, permutations and equivalents thereof will become apparent to those skilled in the art upon a reading of the specification and study of the drawings. For example, many different embodiments of haptic feedback devices can be used to output the haptic sensations described herein, including joysticks, steering wheels, gamepads, and remote controls. Furthermore, certain terminology has been used for the purposes of descriptive clarity, and not to limit the present invention.

I claim:

1. A method for triggering a haptic effect, comprising:
receiving, by at least one processor, sound data;
dividing, by the processor, at least a portion of the sound data into a plurality of frequency ranges;
analyzing the plurality of frequency ranges to identify one or more sound features of the sound data for each frequency range;
associating, by the processor, the plurality of frequency ranges with a plurality of haptic effects, wherein each frequency range is associated with a corresponding haptic effect, and wherein each haptic effect is assigned based on the one or more sound features for the corresponding frequency range; and
triggering, by the processor, the plurality of haptic effects.

2. The method of claim 1, wherein a magnitude of each haptic effect is set to a value proportional to a magnitude of the sound data in the associated frequency range.

3. The method of claim 1, wherein a magnitude of each haptic effect is set to an average magnitude of the sound data in the associated frequency range.

4. The method of claim 1, wherein the dividing the portion of the sound data into the plurality of frequency ranges further comprises applying a plurality of filters to the portion of the sound data.

5. The method of claim 4, wherein the plurality of filters comprises at least one bandpass filter.

6. A system for triggering a haptic effect comprising: one or more processors configured to:
receive sound data;
divide at least a portion of the sound data into a plurality of frequency ranges;
analyze the plurality of frequency ranges to identify one or more sound features of the sound data for each frequency range;
associate the plurality of frequency ranges with a plurality of haptic effects, wherein each frequency range is associated with a corresponding haptic effect, and wherein each haptic effect is assigned based on the one or more sound features for the corresponding frequency range; and
trigger the plurality of haptic effects.

7. The system of claim 6, wherein a magnitude of each haptic effect is set to a value proportional to a magnitude of the sound data in the associated frequency range.

8. The system of claim 6, wherein a magnitude of each haptic effect is set to an average magnitude of the sound data in the associated frequency range.

9. The system of claim 6, wherein the one or more processors are further configured to apply a plurality of filters to the portion of the sound data.

10. The system of claim 9, wherein the plurality of filters comprises at least one bandpass filter.

11. A non-transitory computer readable medium encoded with a computer program comprising instructions that cause a processor to trigger a haptic effect, the triggering comprising:
receiving sound data;
dividing at least a portion of the sound data into a plurality of frequency ranges;
analyzing the plurality of frequency ranges to identify one or more sound features of the sound data for each frequency range;
associating the plurality of frequency ranges with a plurality of haptic effects, wherein each frequency range is associated with a corresponding haptic effect, and wherein each haptic effect is assigned based on the one or more sound features for the corresponding frequency range; and
triggering the plurality of haptic effects.

12. The non-transitory computer readable medium of claim 11, wherein a magnitude of each haptic effect is set to a value proportional to a magnitude of the sound data in the associated frequency range.

13. The non-transitory computer-readable medium of claim 11, wherein a magnitude of each haptic effect is set to an average magnitude of the sound data in the associated frequency range.

14. The non-transitory computer-readable medium of claim 11, wherein the dividing the portion of the sound data into the plurality of frequency ranges further comprises applying a plurality of filters to the portion of the sound data.

15. The non-transitory computer-readable medium of claim 14, wherein the plurality of filters comprises at least one bandpass filter.

* * * * *